United States Patent
Pfertner et al.

(10) Patent No.: US 6,871,900 B2
(45) Date of Patent: Mar. 29, 2005

(54) PASSENGER MOTOR VEHICLE AND A FOLDING TOP THEREFOR

(75) Inventors: Kurt Pfertner, Ditzingen (DE); Thomas Fischer, Tuebingen (DE)

(73) Assignee: Dr. Ing. h.c.F. Porsche AG, Stuttgart (DE)

(*) Notice: Subject to any disclaimer, the term of this patent is extended or adjusted under 35 U.S.C. 154(b) by 0 days.

(21) Appl. No.: 10/417,343

(22) Filed: Apr. 17, 2003

(65) Prior Publication Data

US 2004/0036313 A1 Feb. 26, 2004

(30) Foreign Application Priority Data

Apr. 17, 2002 (DE) .......................................... 102 16 893

(51) Int. Cl.⁷ ................................................ B60J 7/12
(52) U.S. Cl. .................................. 296/107.12; 296/122
(58) Field of Search ................................ 296/109, 114, 296/122, 107.12

(56) References Cited

U.S. PATENT DOCUMENTS

| | | | |
|---|---|---|---|
| 5,829,821 A | 11/1998 | Aydt et al. | 296/122 |
| 5,918,928 A * | 7/1999 | Kolb et al. | 296/107.12 |
| 6,347,827 B1 | 2/2002 | Maass | 296/107.09 |
| 6,454,342 B2 | 9/2002 | Heselhaus et al. | 296/107.07 |
| 6,513,857 B2 | 2/2003 | Pfertner et al. | 296/107.07 |
| 6,601,907 B2 * | 8/2003 | Gutendorf et al. | 296/122 |
| 6,695,385 B1 * | 2/2004 | Lange | 296/107.12 |

FOREIGN PATENT DOCUMENTS

| | | |
|---|---|---|
| DE | 44 41 666 | 12/1995 |
| DE | 19912358 A1 | 9/2000 |
| EP | 1164041 A2 | 6/2001 |
| EP | 1184218 A1 | 6/2001 |

* cited by examiner

Primary Examiner—Jason Morrow
(74) Attorney, Agent, or Firm—Crowell & Moring LLP

(57) ABSTRACT

A passenger vehicle a folding top can be changed from a closed position spanning a passenger compartment into a storage position. The folding top includes a folding top frame structure and a folding top cover which is held in place on the folding top frame structure, and a rigid rear window. The folding top frame structure has at least one rear, U-shaped tensioning bar which in the closed position of the folding top can be displaced into a substantially horizontal tensioned position and into an upward folded, for example upright, mounted position and which on its free bar ends is seated in a swivel axis that runs roughly parallel to the vehicle's transverse axis. For improved accessibility of the storage compartment each leg of the U-shaped tensioning bar is connected with the swivel axis by means of a detachable connecting device.

41 Claims, 4 Drawing Sheets

PASSENGER MOTOR VEHICLE AND A FOLDING TOP THEREFOR

BACKGROUND AND SUMMARY OF THE INVENTION

This application claims the priority of German Application No. 102 16 893.8 filed Apr. 17, 2002.

The invention is based on a motor vehicle, especially a passenger vehicle, with a folding top. Preferred embodiments relate to passenger vehicles with a folding top which can be changed from a closed position spanning a passenger compartment into a storage position and which includes: a folding top frame structure, a folding top cover which is held in use in place on the folding top frame structure, and a rigid rear window, wherein said folding top frame structure comprises at least one rear, U-shaped tensioning bar, which in a closed position of the folding top can be displaced into a substantially horizontal tensioned position and into an upward folded upright mounted position and which on its free bar ends is seated in a swivel axis that runs roughly parallel to a vehicle's transverse axis.

A motor vehicle of the generic kind is known from German Patent Document DE 44 41 666 C1, (U.S. Pat. No. 5,829,821). It comprises a folding top, which can be changed from a closed position spanning the passenger compartment into a storage position on the rear of the vehicle. The folding top contains a folding top structure, which apart from other frame components includes a U-shaped tensioning bar that in the closed position of the folding top can assume a substantially horizontal tensioning position or can assume an upward folded, for example vertical mounted position. In addition, the folding top contains a folding top covering, which is held in position on the folding top structure and includes a rigid rear window. The mounted position can also be described as the service position and serves in particular the purpose of accessing a storage compartment located beneath the tensioning bar or for performing maintenance and/or repair work on the folding top. Especially in the case of a motor vehicle with central motor configuration, the tensioning bar, which can be brought into the mounted position, has proven useful for maintaining accessibility to the driving motor, even if the remaining folding top component assume the positions as they would in the closed state.

It is an object of the invention to create a motor vehicle of the kind mentioned at the beginning where in the closed position of the folding top the tensioning bar can be transferred into the mounted position without difficulty and without the rigid rear window impairing the mounted position.

This object is achieved with a motor vehicle, especially a passenger vehicle, with a folding top, which can be changed from a closed position spanning a passenger compartment into a storage position and which includes: a folding top frame structure, a folding top cover which is held in use in place on the folding top frame structure, and a rigid rear window, wherein said folding top frame structure comprises at least one rear, U-shaped tensioning bar, which in a closed position of the folding top can be displaced into a substantially horizontal tensioned position and into an upward folded upright mounted position and which on its free bar ends is seated in a swivel axis that runs roughly parallel to a vehicle's transverse axis, and wherein each leg of the U-shaped tensioning bar is connected with the swivel axis by means of a detachable connecting device.

Further advantageous features of preferred embodiments of the Invention are described herein and in the claims.

Substantial advantages accomplished with the invention are that due to the detachable connecting device the tensioning bar can be decoupled from the swivel axis so that it can be displaced into the desired mounted position upward, i.e. from its horizontal tensioned position against the driving direction, without the rear window impairing the swivel path. This way, accessibility to the storage compartment in the rear can be ensured in a simple manner when the tensioning bar has been moved into the mounted position. In the mounted position of the tensioning bar, however, folding top components located on the interior are also accessible for example for adjusting purposes so that the invented tensioning bar can be employed not only in motor vehicles with central engine configuration.

In a design pursuant to certain preferred embodiments of the Invention, each leg of the U-shaped tensioning bar consists of two elements. Both leg elements of each leg are attached to each other through the connecting device and can also be detached from each other through the connecting device to allow the tensioning bar to be changed into the mounted position.

Preferred is a connecting device in which the two elements of the leg are not detached completely from each other, however in which a relative motion of these two leg elements to each other is given. This can be achieved in a simple and cost-effective manner according to certain preferred embodiments of the Invention by a folding axis, which is provided in addition to the swivel axis and runs at a distance to and roughly parallel to the swivel axis. The tensioning bar is brought into the mounted position by moving it about said folding axis. According to certain preferred embodiments of the Invention, this folding axis is preferably arranged above the swivel axis.

Pursuant to another design of certain preferred embodiments of the Invention, the connecting device, however, can also be designed as a separable or telescoping plug coupling, which contains a plug element receiver on one of the leg elements of a leg and a plug element on the other plug element of the same leg, which in the case of a closed connecting device is in the plug element receiver. With a separated plug coupling the tensioning bar is stretched so that it can move beyond the rigid rear window about the swivel axis into the mounted position.

In certain preferred embodiments of the Invention the tensioning bar can be displaced into the mounted position by equipping each leg end with an elongated hole that is adjusted in the direction of the central longitudinal axis of the leg and in which the swivel axis engages. This variation of the design also achieves an elongation of the leg. To ensure safe functioning of the folding top, certain preferred embodiments of the Invention also provides that the tensioning bar be localized or locked with the connecting device in a first displacement position that is specified in relation to the swivel axis, wherein said first displacement position is assigned to the tensioned position of the tensioning bar. With a detached connecting device, the tensioning bar is displaced along the elongated hole into the second displacement position, which is allocated to the mounted position of the tensioning bar. In the second displacement position, the basis of the U-shaped leg has a greater distance to the swivel axis so that the rigid rear window is not located in the swivel path of the tensioning bar when shifting the tensioning bar into the mounted position.

Additional designs are also described in the remaining dependent claims.

These and further objects, features and advantages of the present invention will become more readily apparent from the following detailed description thereof when taken in conjunction with the accompanying drawings.

DETAILED DESCRIPTION OF THE DRAWINGS

Figure 1:
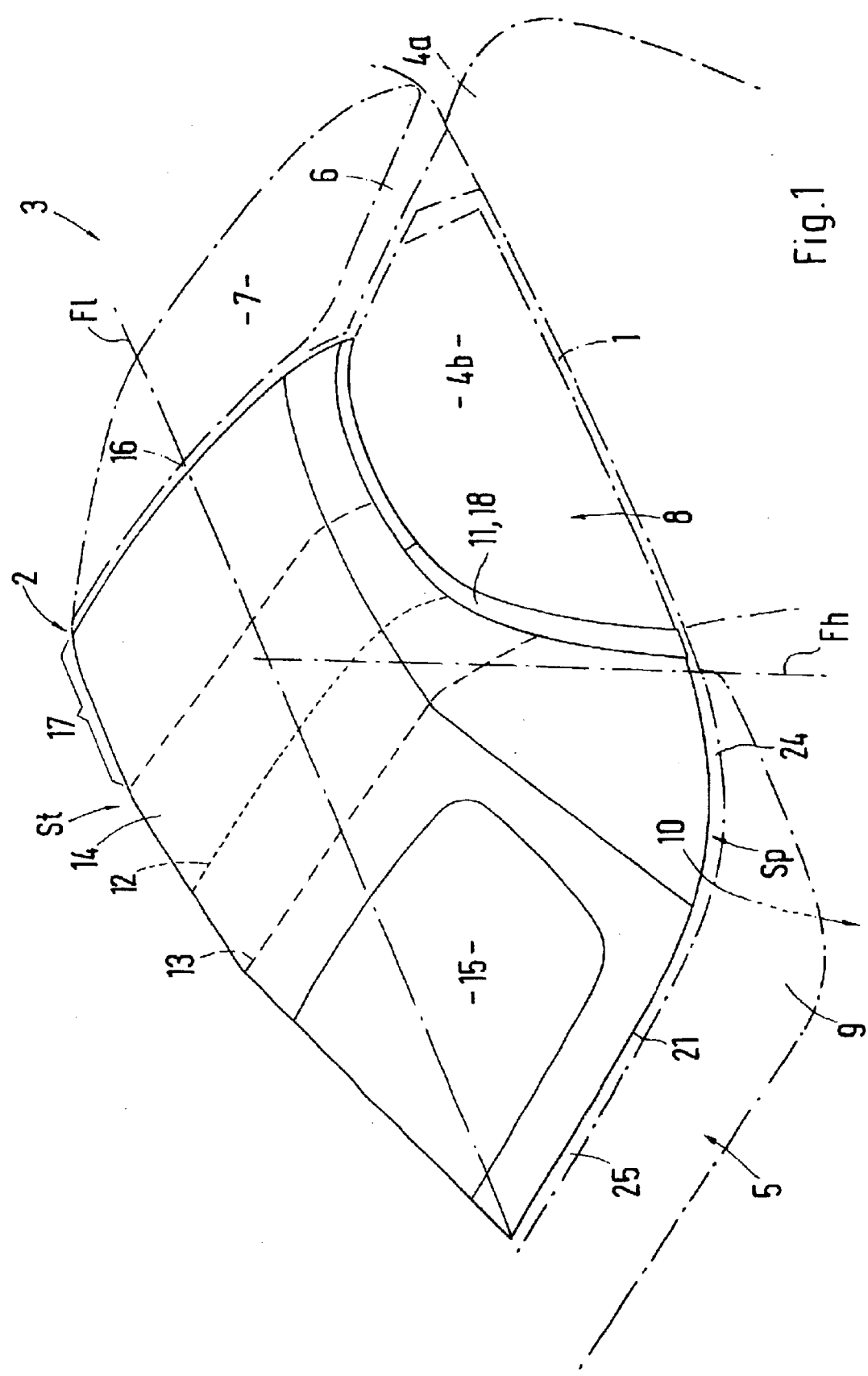
FIG. 1 is a sectional view of a motor vehicle with a folding top constructed according to certain preferred embodiments of the Invention.

FIG. 1 shows a sectional view, above a belt line 1 of the vehicle body, of a folding top 2 for a motor vehicle 3, particularly a passenger vehicle, which is symmetrical to the vehicle's central longitudinal plane. The motor vehicle 3 is preferably a convertible with a folding top 2. Beneath the belt line 1, the vehicle body also contains a side door 4a with side window 4b on each side and in addition to the front area, which is not depicted here, a rear area 5. The body includes also a windshield 7 that is arranged in a windshield frame 6. The folding top 2 spans the passenger compartment 8 of the motor vehicle 3 in the closed position St shown in FIG. 1. The folding top 2 can also be transferred into a storage position, which is not depicted here and in which it is stored in the rear 5 in a folding top storage box located beneath the rear folding top box lid 9. In a preferred design, the motor vehicle 3 is a two-seat sports car where through a center motor configuration the driving motor can be arranged in a receiving compartment 10, which is arranged in particular beneath the folding top storage box and behind the passenger compartment 8.

The folding top 2 comprises a folding top frame structure 18 (FIG. 2), which is attached to the vehicle body and from which in FIG. 1 a side roof frame 11 is shown. The folding top frame structure 18 also contains at least one transverse hoop 12 and/or 13, indicated here with dotted lines, wherein the front hoop 12 can form in particular the main hoop and the rear hoop 13 can form the corner hoop. A folding top cover 14, in which a rigid rear window 15 is inserted that is preferably connected exclusively with the folding top cover 14, is also held in place by the folding top frame structure 18. The folding top 2 extends from the rear 5 to the transverse frame part 16 of the windshield frame 6 in the closed position St. The front folding top section 17 located adjacent to the transverse frame part 16 is designed in particular as a rigid half that is covered by the folding top cover 14.

Figure 2:
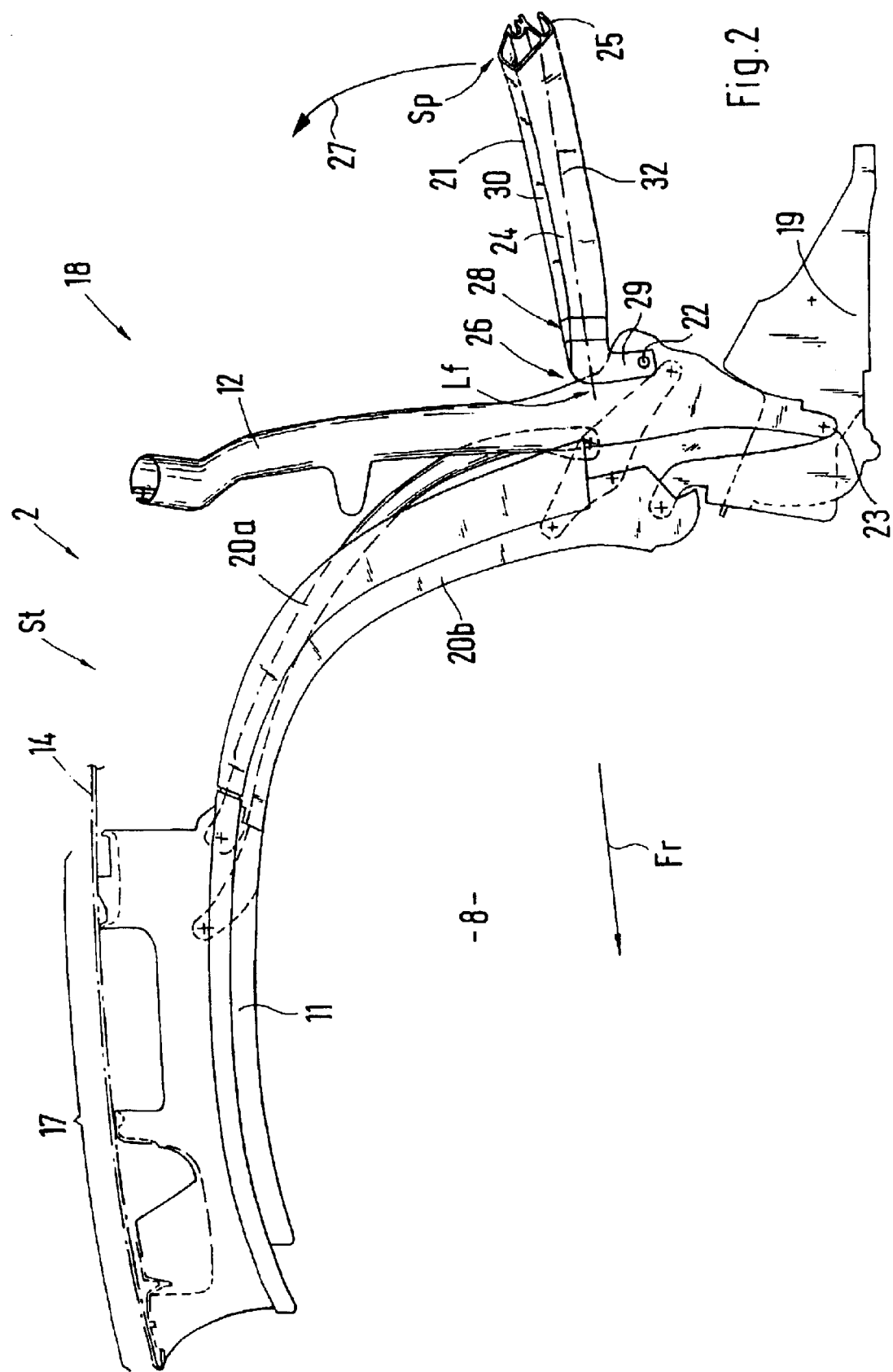
FIG. 2 shows the folding top of Figure in a detailed schematic view.

FIG. 2 depicts the folding top 2 with its folding top frame structure 18 in detail. Equivalent parts as in FIG. 1 have been marked with the same reference numbers. The folding top frame structure 18 is pivotably connected to a folding top bearing 19, which is connected with the vehicle body, so as to be able to displace it from the closed position St into the rear storage position. The folding top frame structure 18 here contains apart from the side roof frame 11 also a side link rod set 20a, 20b, which can form a four-bar mechanism. Both link rods 20a, 20b are pivotably connected with their one end to the roof frame 11, particularly in the area of the section 17, and with their other end to the folding top bearing 19 or other components of the folding top frame structure 18. The main hoop 12 is displaceably attached to the folding top bearing 19. The corner hoop 13, which is not shown in FIG. 2, is also displaceably attached.

In addition, the folding top frame structure 18 is allocated a rear tensioning bar 21, which is displaceably attached to the folding top frame structure 18 or the folding top bearing 19 so as to swivel about a swivel axis 22 to allow it assume the substantially horizontal tensioned position Sp depicted in FIG. 2, in which it stretches the folding top cover 14 on the folding top frame structure 18. Its swivel axis 22 is provided especially on the main hoop 12 in the lower area, for example adjacent to said hoop's connecting axis 23 on the folding top bearing 19. The tensioning bar 21 has—as hinted especially in FIG. 1—a U-shaped arched design that is symmetrical to the vehicle's central longitudinal plane. Accordingly the tensioning bar 21 contains two tensioning bar legs, of which only one leg 24 is shown, and it contains a tensioning bar basis 25 connecting the legs 24. The tensioning bar 21 is held pivotably on the respectively free leg end 26 so as to swivel about the swivel axis 22 to allow it to fold upward from the tensioned position Sp following the direction of the arrow 27 into a service or mounted position, i.e. opposite the driving direction Fr.

To prevent the rear window 15 from hindering the tensioning bar 21 in its displacement from the tensioned position Sp into the mounted position, a connecting device 28 that decouples the tensioning bar 21 from its fixed position allocation to the swivel axis 22 is provided, which allows each leg 24 of the U-shaped tensioning bar 21 to be connected with the swivel axis 22 in a detachable and re-attachable manner. The connecting device 28 is described in greater detail in the following in various examples based on FIGS. 3 through 6.

Figure 3:
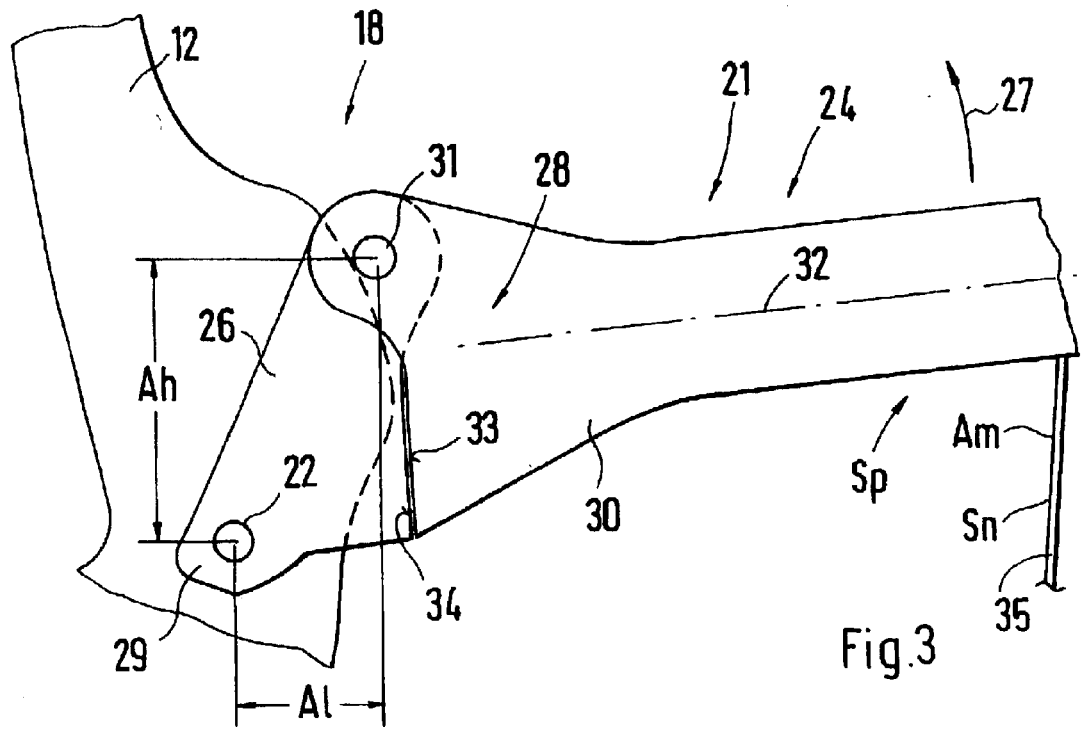
FIGS. 3 through 6 are respective schematic views showing respective embodiments of tensioning or assemblies constructed according to preferred embodiments of the Invention.
Figure 4:
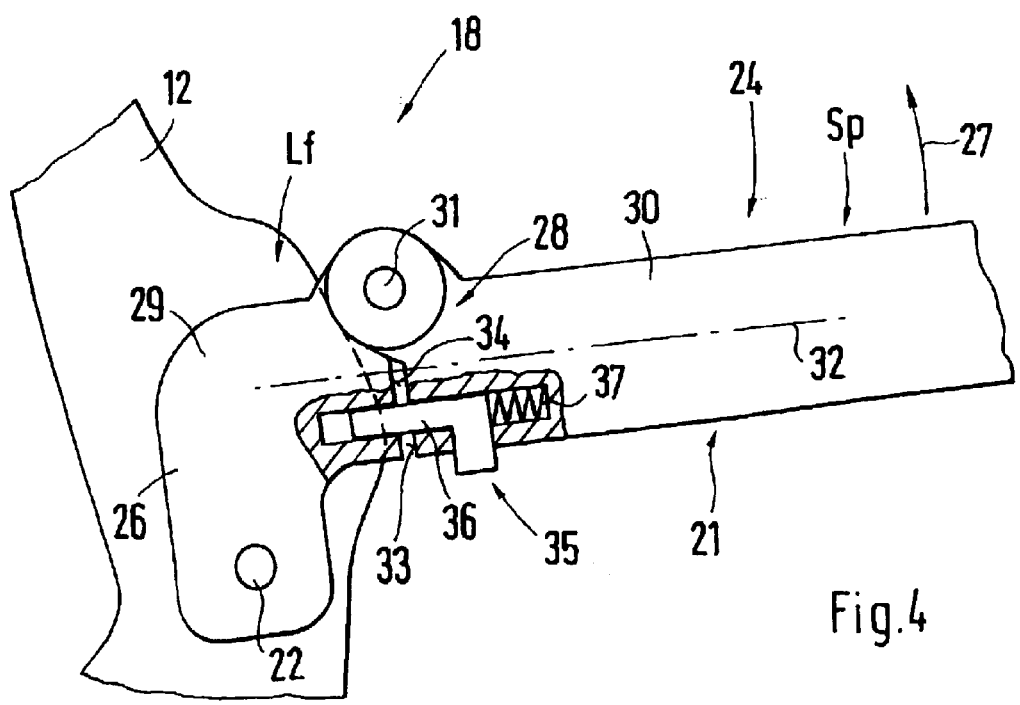
Figure 5:
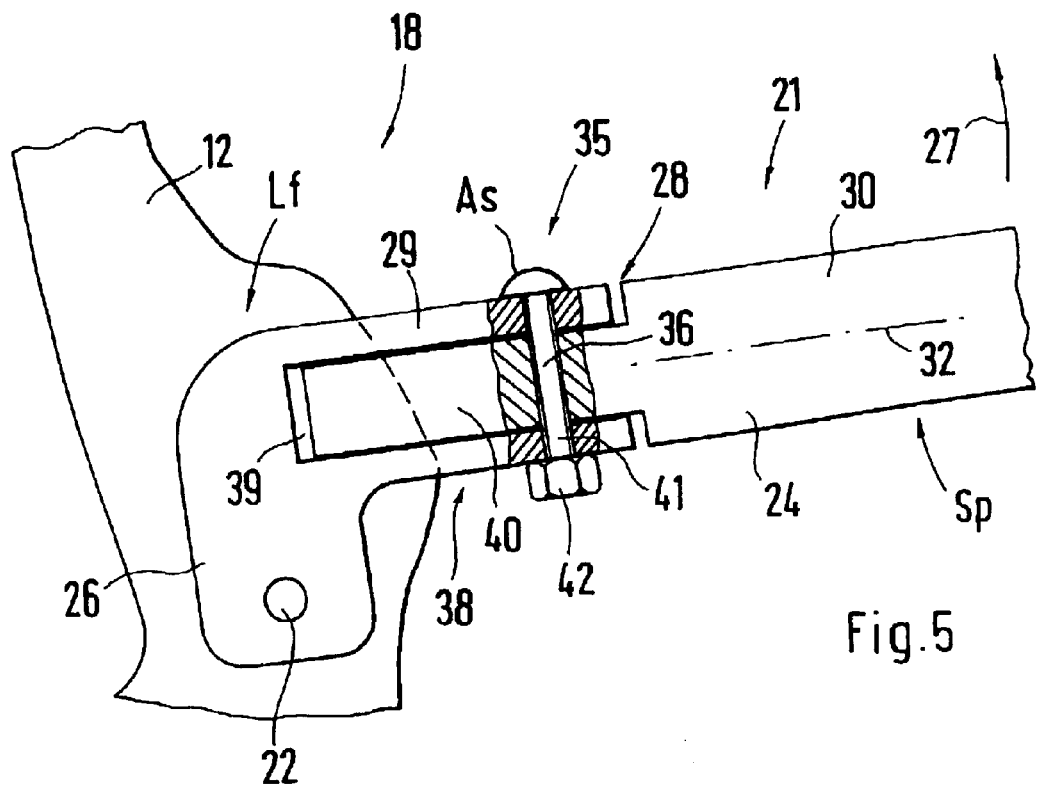

FIGS. 3, 4 and 5 show that the leg 24 of the U-shaped tensioning bar 21 is produced in two pieces and thus comprises two leg elements 29 and 30, which are connected with each other through the connecting device 28. The connecting device 28 is provided in the vicinity of the swivel axis 22 so that the leg element 29 that is connected with the swivel axis 22 is considerably shorter than the other leg element 30.

Pursuant to a first design, the connecting device 28 from FIG. 3 is equipped with a folding axis 31, which runs parallel to the swivel axis 22, but at a distance Ah and/or Al thereto, wherein said distance is measured in the direction of the vehicle's longitudinal axis Fl (distance Al) and/or in the direction of the vehicle's vertical axis Fh (distance Ah). In particular, the folding axis 31 is arranged above the swivel axis 22 and preferably above the central longitudinal axis 32 of the leg 24, while the swivel axis 22 can be located beneath said central longitudinal axis 32. Beneath the folding axis 31 each leg element 29 or 30 contains a lock stop 33 or 34, respectively, which face each other and thus permit a folding direction only in the direction of the arrow 27 and block the other folding direction against the arrow 27 when the tensioning bar 21 is in the tensioned position Sp. To prevent the tensioning bar 21 from being displaced unintentionally into the mounted position, the connecting device is assigned a removable locking element 35, which is implemented as a tensioning device Am with a tensioning rope Sn and pulls the tensioning bar 21 downward, i.e. against the direction of the arrow 27. The tensioning rope Sn is stretched detachably between the tensioning bar 21 and for example the vehicle body and pulls both lock stops 33 and 34 against each other.

In the connecting device 28 pursuant to a second design depicted in FIG. 4 the detachable locking element 35 is formed by a moving latch 36, which engages with both leg elements 29 and 30 when the connecting device 28 is closed. The latch 36 can be displaced for example parallel to the central longitudinal axis 32 against the force of a spring 37 and is thus pulled out of one of the two leg elements 29 and 30, releasing the folding axis 31 only in the folding direction 27. The lock stops 33 and 34 can be provided as in the first design. The end 26 is implemented as an L-shaped extension Lf.

In the third design of the connecting device 28 shown in FIG. 5 instead of the folding axis a lengthening of the leg 24 is possible. The connecting device 28 is implemented here as a plug connection 38 that lengthens the leg 24 or separates the leg elements 29 and 30, wherein said plug connection contains a plug element receiver 39 on the one leg element 29 and a plug element 40 on the other leg element 30. Plug element receiver 39 and plug element 40 are largely aligned parallel to the central longitudinal axis 32 of the leg 24. With a closed plug coupling 38 the removable locking element 35, which in this case contains a screw-on or plug pin 41 as the latch 36 whose plug direction runs mostly transverse to the central longitudinal axis 32, penetrates both the plug element receiver 39 and the plug element 40. The plug pin 41 comprising a stop As can contain an exterior thread on its other end, which can be screwed onto a fastening element 42 so that the plug pin 41 can be secured against sliding out. If both leg elements 29 and 30 are lengthened, the tensioning bar 21 can be brought about the swivel axis 22 into the mounted position; if however both leg elements 29 and 30 are completely detached from each other, the swivel axis 22 is without function when the mounted position is assumed.

Figure 6:
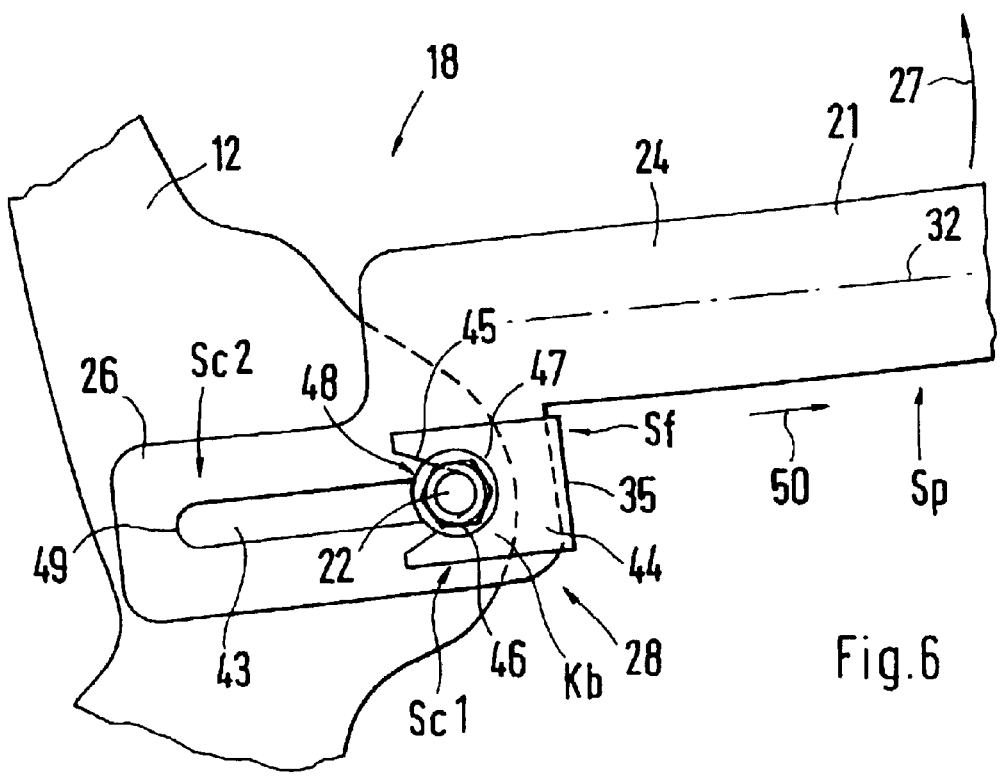

FIG. 6 finally depicts a fourth design of a connecting device 28. The leg 24 of the U-shaped tensioning bar 21 can have a single-piece design and contains on the free end 26 an elongated hole 43 through which the swivel axis 22 engages. On the end 26 containing a step Sf a locking element 35 is placed on the step Sf, which here is implemented as a removable clamp 44 that reaches around the leg 24 on both sides and possibly around the main hoop 12.

The clamp 44 grips both the step Sf of the leg end 26 and the swivel axis 22 and comprises a snap-fit recess 45, which causes it to latch to the swivel axis 22 that is formed e.g. by a bolt. In order to avoid it from sliding laterally out of the swivel axis 22, a ring-shaped securing element 46 can be placed onto the swivel axis. Between the securing element 46 and one of the two clamp bows Kb of the clamp 44 a disk 47 can additionally be arranged. If the tensioning bar 21 is supposed to be displaced from its tensioned position Sp shown in FIG. 6 into the mounted position 27, the clamp 44 is removed from the swivel axis 22 or the tensioning bar is pulled backward (arrow 50), causing the snap latch of the snap-fit recess 45 to be overcome. This way the tensioning bar 21 can be displaced from its first displacement position Sc1 shown in FIG. 6 on the first end 48 of the elongated hole 43 in the tensioned position Sp into a second displacement position Sc2, wherein said second displacement position Sc2 is assigned to the mounted position and is located on the second end 49 of the elongated hole 43, which can be aligned parallel to the central longitudinal axis 32. Through the shift from the first displacement position Sc1 into the second displacement position Sc2, the tensioning bar basis 25 is brought into a position of greater distance to the swivel axis 22 or the effective length of the leg 24 is increased, allowing the tensioning bar 21 to be displaced into the mounted position without being impaired by the rear window 15.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Motor vehicle with a folding top, which can be changed from a closed position spanning a passenger compartment into a storage position and which includes:

a folding top frame structure, a folding top cover which is held in use in place on the folding top frame structure, and a rigid rear window, wherein said folding top frame structure comprises at least one rear, U-shaped tensioning bar, which in a closed position of the folding top can be displaced into a substantially horizontal tensioned position and into an upward folded upright mounted position and which on its free bar ends is seated in a swivel axis that runs roughly parallel to a vehicle's transverse axis, and wherein each leg of the U-shaped tensioning bar is connected with the swivel axis by means of a detachable connecting device.

2. Motor vehicle pursuant to claim 1, wherein each leg of the tensioning bar contains two leg elements, and wherein that the two leg elements are detachably connected to the connecting device.

3. Motor vehicle pursuant to claim 1, wherein the connecting device comprises a folding axis which runs at a distance from and roughly parallel to the swivel axis, and wherein the tensioning bar can be displaced about the folding axis into the mounted position.

4. Motor vehicle pursuant to claim 2, wherein the connecting device comprises a folding axis which runs at a distance from and roughly parallel to the swivel axis, and wherein the tensioning bar can be displaced about the folding axis into the mounted position.

5. Motor vehicle pursuant to claim 2, wherein the connecting device is designed as a plug coupling which contains a plug element receiver on one leg element of a respective leg and a plug element on the other leg element of the same respective leg.

6. Motor vehicle pursuant to claim 1, wherein each leg end comprises an elongated hole that is aligned in a direction of the central longitudinal axis of the leg and with which the swivel axis engages, wherein the tensioning bar is locked through the connecting device in a first displacement position that is specified in relation to the swivel axis, wherein said first displacement position is assigned to the tensioned position, wherein the tensioning bar with a detached connecting device can be displaced along the elongated hole into a second displacement position, and wherein said second displacement position is assigned to the mounted position and in which the basis of the tensioning bar is located at a greater distance to the swivel axis than in the first displacement position.

7. Motor vehicle pursuant to claim 6, wherein the connecting device comprises a detachable clamp which engages both on a leg end and on the swivel axis and keeps the tensioning bar in its first displacement position relative to the swivel axis.

8. Motor vehicle pursuant to claim 2, wherein the connecting device comprises a removable locking element which holds the two leg elements against each other.

9. Motor vehicle pursuant to claim 4, wherein the connecting device comprises a removable locking element which holds the two leg elements against each other.

10. Motor vehicle pursuant to claim 5, wherein the connecting device comprises a removable locking element which holds the two leg elements against each other.

11. Motor vehicle pursuant to claim 3, wherein the folding axis is located above a central longitudinal axis of the legs of the tensioning bar.

12. Motor vehicle pursuant to claim 4, wherein the folding axis is located above the central longitudinal axis of the legs of the tensioning bar.

13. Motor vehicle pursuant to claim 3, wherein, proceeding from a tensioning bar in the tensioned position, the tensioning bar can be folded about the folding axis only in a direction of the mounted position and is blocked into the other, opposite folding direction.

14. Motor vehicle pursuant to claim 11, wherein, proceeding from a tensioning bar in the tensioned position, the tensioning bar can be folded about the folding axis only in a direction of the mounted position and is blocked into the other, opposite folding direction.

15. Motor vehicle pursuant to claim 13, wherein a lock stop is incorporated beneath the folding axis of the leg on each of the leg elements, and
wherein, in the tensioned position of the tensioning bar, the lock stops rest against each other.

16. Motor vehicle pursuant to claim 14, wherein a lock stop is incorporated beneath the folding axis of the leg on each of the leg elements, and
wherein, in the tensioned position of the tensioning bar, the lock stops rest against each other.

17. Motor vehicle pursuant to claim 8, wherein the locking element contains a latch which engages with both leg elements of a leg.

18. Motor vehicle pursuant claim 9, wherein the locking element contains a latch which engages with both leg elements of a leg.

19. Motor vehicle pursuant claim 10, wherein the locking element contains a latch which engages with both leg elements of a leg.

20. Motor vehicle pursuant to claim 17, wherein the latch can be displaced against the force of a spring in one of the leg elements in the release position.

21. Motor vehicle pursuant to claim 18, wherein the latch can be displaced against the force of a spring in one of the leg elements in the release position.

22. Motor vehicle pursuant to claim 19, wherein the latch can be displaced against the force of a spring in one of the leg elements in the release position.

23. Motor vehicle pursuant to claim 8, wherein the locking element is formed by a tensioning device which extends between the tensioning bar and the motor vehicle, and
wherein the tensioning device pulls the two lock stops against each other.

24. Motor vehicle pursuant to claim 23, wherein the tensioning device is a rope.

25. Motor vehicle pursuant to claim 9, wherein the locking element is formed by a tensioning device which extends between the tensioning bar and the motor vehicle, and
wherein the tensioning device pulls the two lock stops against each other.

26. Motor vehicle pursuant to claim 10, wherein the locking element is formed by a tensioning device which extends between the tensioning bar and the motor vehicle, and
wherein the tensioning device pulls the two lock stops against each other.

27. Motor vehicle pursuant to claim 8, wherein the locking element contains a plug pin as a latch, which reaches through a plug element receiver and a plug element.

28. A folding top frame structure for holding a folding top cover at a passenger vehicle which includes a rigid rear window comprising
a rear U-shaped tensioning bar which in a closed position of the folding top cover can be selectively displaced into a substantially horizontal tensioned position and into an upward folded upright mounted position, said tensioning bar being mounted in use with its free bar ends disposed in a swivel axis extending substantially parallel to a vehicle transverse axis, and
a connecting device connecting respective legs of the tensioning bar with the swivel axis to thereby accommodate selective positioning of the tensioning bar in said tensioned and mounted position without interfering with the rigid rear window.

29. A folding top frame structure according to claim 28, wherein each leg of the tensioning bar contains two leg elements, and
wherein that the two leg elements are detachably connected to the connecting device.

30. A folding top frame structure according to claim 28, wherein the connecting device comprises a folding axis which runs at a distance from and roughly parallel to the swivel axis, and
wherein the tensioning bar can be displaced about the folding axis into the mounted position.

31. A folding top frame structure according to claim 28, wherein the connecting device is designed as a plug coupling which contains a plug element receiver on one leg element of a respective leg and a plug element on the other leg element of the same respective leg.

32. A folding top frame structure according to claim 28, wherein each leg end comprises an elongated hole that is aligned in a direction of the central longitudinal axis of the leg and with which the swivel axis engages,
wherein the tensioning bar is locked through the connecting device in a first displacement position that is specified in relation to the swivel axis,
wherein said first displacement position is assigned to the tensioned position,
wherein the tensioning bar with a detached connecting device can be displaced along the elongated hole into a second displacement position, and
wherein said second displacement position is assigned to the mounted position and in which the basis of the tensioning bar is located at a greater distance to the swivel axis than in the first displacement position.

33. A folding top frame structure according to claim 32, wherein the connecting device comprises a detachable clamp which engages both on a leg end and on the swivel axis and keeps the tensioning bar in its first displacement position relative to the swivel axis.

34. A folding top frame structure according to claim 29, wherein the connecting device comprises a removable locking element which holds the two leg elements against each other.

35. A folding top frame structure according to claim 30, wherein the folding axis is located above the central longitudinal axis of the legs of the tensioning bar.

36. A folding top frame structure according to claim 30, wherein, proceeding from a tensioning bar in the tensioned position, the tensioning bar can be folded about the folding axis only in a direction of the mounted position and is blocked into the other, opposite folding direction.

37. A folding top frame structure according to claim 36, wherein a lock stop is incorporated beneath the folding axis of the leg on each of the leg elements, and wherein, in the tensioned position of the tensioning bar, the lock stops rest against each other.

38. A folding top frame structure according to claim 34, wherein the locking element contains a latch which engages with both leg elements of a leg.

39. A folding top frame structure according to claim 34, wherein the latch can be displaced against the force of a spring in one of the leg elements in the release position.

40. A folding top frame structure according to claim 34, wherein the locking element is formed by a tensioning device which extends between the tensioning bar and the motor vehicle, and wherein the tensioning device pulls the two lock stops against each other.

41. A folding top frame structure according to claim 34, wherein the tensioning device is a rope.

* * * * *